(12) United States Patent
Kalgi

(10) Patent No.: US 12,125,023 B2
(45) Date of Patent: Oct. 22, 2024

(54) ENCRYPTED PAYMENT TRANSACTIONS

(71) Applicant: Visa International Service Association, San Francisco, CA (US)

(72) Inventor: Avinash Kalgi, Kirkland, WA (US)

(73) Assignee: Visa International Service Association, San Francisco, CA (US)

(*) Notice: Subject to any disclaimer, the term of this patent is extended or adjusted under 35 U.S.C. 154(b) by 384 days.

(21) Appl. No.: 17/343,465

(22) Filed: Jun. 9, 2021

(65) Prior Publication Data

US 2021/0295311 A1  Sep. 23, 2021

Related U.S. Application Data

(62) Division of application No. 14/591,761, filed on Jan. 7, 2015, now Pat. No. 11,062,301.

(60) Provisional application No. 61/924,676, filed on Jan. 7, 2014.

(51) Int. Cl.
  *G06Q 20/36* (2012.01)
  *G06Q 20/38* (2012.01)
  *G06Q 20/40* (2012.01)

(52) U.S. Cl.
  CPC ........... *G06Q 20/367* (2013.01); *G06Q 20/36* (2013.01); *G06Q 20/3829* (2013.01); *G06Q 20/401* (2013.01)

(58) Field of Classification Search
  CPC . G06Q 20/367; G06Q 20/3829; G06Q 20/401
  See application file for complete search history.

(56) References Cited

U.S. PATENT DOCUMENTS

| | | | |
|---|---|---|---|
| 8,150,767 B2 | 4/2012 | Wankmueller | |
| 8,336,771 B2 | 12/2012 | Tsai et al. | |
| 8,577,804 B1 | 11/2013 | Bacastow | |
| 10,445,720 B2 | 10/2019 | Priest et al. | |
| 2003/0028481 A1 | 2/2003 | Flitcroft et al. | |
| 2010/0076890 A1 | 3/2010 | Low et al. | |
| 2012/0271771 A1 | 10/2012 | Bishop et al. | |
| 2013/0080333 A1 | 3/2013 | Kamotskyy et al. | |
| 2013/0297504 A1 | 11/2013 | Nwokolo et al. | |
| 2015/0302397 A1 | 10/2015 | Kalgi | |

OTHER PUBLICATIONS

AU2015204913, "First Examination Report", Sep. 25, 2019, 6 pages.

(Continued)

*Primary Examiner* — John W Hayes
*Assistant Examiner* — Zehra Raza
(74) *Attorney, Agent, or Firm* — Kilpatrick Townsend & Stockton LLP

(57) ABSTRACT

Systems, apparatuses, and methods are provided for conducting encrypted payment transactions. In some embodiments, a payment device may send account credentials for a digital wallet to a wallet provider computer, and receive encrypted payment data from the wallet provider computer in response. The payment device may then send a request to initiate a transaction to a transaction processor computer (e.g., a merchant computer or a merchant processor computer), the request to initiate the transaction including the encrypted payment data. The transaction processor computer can then decrypt the encrypted payment data and conduct the transaction.

11 Claims, 9 Drawing Sheets

(56) References Cited

OTHER PUBLICATIONS

AU2015204913, "Second Examination Report", Mar. 10, 2020, 4 pages.
Application No. PCT/US2015/010469, International Search Report and Written Opinion, Mailed on Apr. 21, 2015, 10 pages.
U.S. Appl. No. 14/591,761, Final Office Action, Mailed on Jun. 18, 2018, 17 pages.
U.S. Appl. No. 14/591,761, Final Office Action, Mailed on Nov. 9, 2020, 17 pages.
U.S. Appl. No. 14/591,761, Non-Final Office Action, Mailed on Nov. 2, 2017, 15 pages.
U.S. Appl. No. 14/591,761, Non-Final Office Action, Mailed on Jan. 13, 2020, 17 pages.
U.S. Appl. No. 14/591,761, Notice of Allowance, Mailed on Mar. 9, 2021, 18 pages.

ENCRYPTED PAYMENT TRANSACTIONS

CROSS-REFERENCES TO RELATED APPLICATIONS

The present application is a divisional of U.S. patent application Ser. No. 14/591,761 filed Jan. 7, 2015 which is a non-provisional application of and claims priority to U.S. Provisional Application No. 61/924,676, filed on Jan. 7, 2014, the entire contents of which are hereby incorporated by reference for all purposes.

BACKGROUND

The use of mobile phones, tablets, and other payment devices for conducting payment transactions continues to increase. For example, merchants may use mobile devices as point of sale (POS) terminals. But, such implementations can require much expense on a merchant to keep data secure during a transaction.

Users may also use mobile devices to conduct transactions, for example by using a merchant-specific app. In some cases, a user may want to use a digital wallet service (e.g., a hosted wallet) to provide payment for a transaction. But, typical use of a digital wallet service can require other infrastructure changes.

Embodiments of the present invention address these problems and other problems individually and collectively.

BRIEF SUMMARY

Embodiments of the invention relate to systems and methods for conducting encrypted payment transactions.

In some embodiments, a payment device may send account credentials for a digital wallet to a wallet provider computer, and receive encrypted payment data from the wallet provider computer in response. The payment device may then send a request to initiate a transaction to a transaction processor computer (e.g., a merchant computer or a merchant processor computer), the request to initiate the transaction including the encrypted payment data. The transaction processor computer can then decrypt the encrypted payment data and conduct the transaction.

Other embodiments are directed to systems, portable consumer devices, and computer readable media associated with methods described herein.

A better understanding of the nature and advantages of embodiments of the present invention may be gained with reference to the following detailed description and the accompanying drawings.

TERMS

Figure 1:
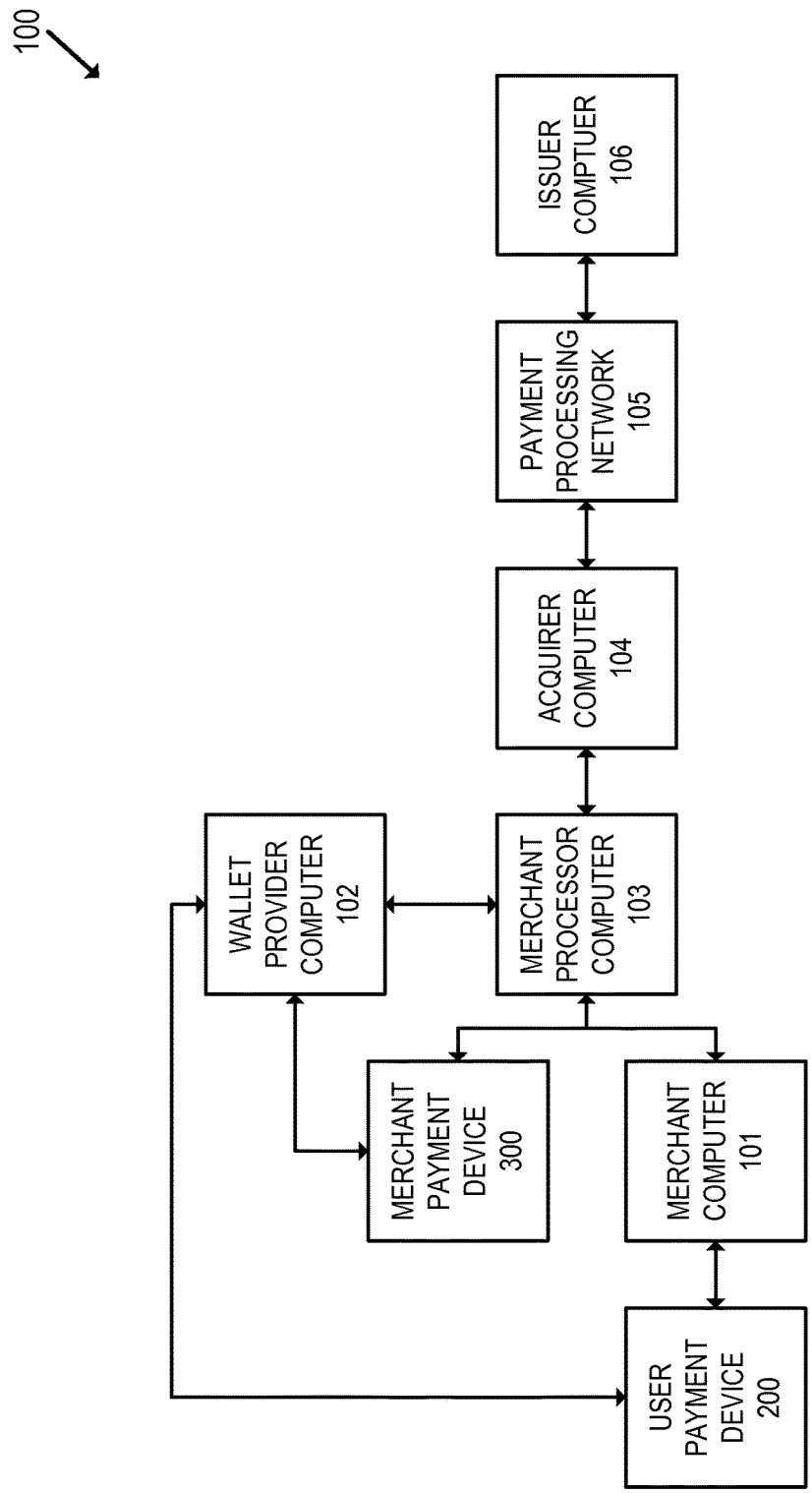
FIG. 1 shows an exemplary system that may be used with embodiments of the invention.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "digital wallet" may include any account or record associated with one or more payment methods. In some embodiments, records relating to a digital wallet may be stored on a server computer, such as a wallet provider computer. The digital wallet may comprise "payment data" for the one or more payment methods. Examples of payment data may include a primary account number (PAN), an expiration date of the PAN or account, a bank account number, a bank routing number, or any other information suitable to authorize a payment transaction. Payment data may be encrypted (i.e., "encrypted payment data") using any suitable algorithm, such as by using a symmetric key or asymmetric key. In some cases, payment information may be encrypted using a derived key.

The term "transaction data" may include any data or other information relating to a transaction. Examples of transaction data include goods or services to be purchased, an amount for the transaction, information relating to a user conducting a transaction (e.g., the user's name, shipping address, and billing address), information relating to a merchant associated with the transaction, or any other suitable data.

A "base derivation key" may include any encryption key or other data that is used to derive another encryption key. A base derivation key may be asymmetric or symmetric, and may be implemented in accordance with any suitable encryption standard, such as AES, DES, RSA, and ECC.

A "key serial number" (KSN) may include any data or other information that can be used to derive an encryption key, such as a derived key. In some cases, data in a key serial number can be directly used as an input into a key derivation function. For example, in some embodiments, a key serial number can include a wallet serial number and/or a transaction counter, each of which may be used as an input into a key derivation function. In some cases, data in a key serial number can be used to retrieve other data that is then used as an input into a key derivation function. For example, a key serial number may comprise a "base key identifier" used to identify a base derivation key. A key derived from such a key serial number may be generated by retrieving the base derivation key corresponding to the base key identifier, and the base derivation key can be used as an input to a key derivation function.

A "wallet serial number" may include any data or other information suitable to identify a digital wallet corresponding to a user. In some cases, a wallet serial number may be unique to a wallet provider, so that no two digital wallet accounts maintained by the same wallet provider have the same wallet serial number. In some cases, a wallet serial number may be globally unique.

A "transaction counter" may include any count or string representing a number of transactions conducted using the digital wallet. In some cases, the transaction counter may be an integer that is incremented each time the transaction is conducted. In some embodiments, the wallet serial number and transaction counter may have a fixed bit-length.

A "derived key" may include any encryption key or other data that is derived from one or more data elements. A derived key may be asymmetric or symmetric. In some cases, a derived key may be generated using a key derivation function, such as the standard Password-Based Key Derivation Function 2 (PBKDF2). In some cases, a derived key may be generated from another encryption key (i.e., a base derivation key) and other data, such as a wallet serial number and a transaction counter included in a key serial number.

DETAILED DESCRIPTION

Embodiments of the invention relate to systems and methods for conducting encrypted payment transactions. In some embodiments, a payment device may send account credentials for a digital wallet to a wallet provider computer, and receive encrypted payment data in response. The payment device may then send a request to initiate a transaction to a transaction processor computer (e.g., a merchant computer or a merchant processor computer), the request to initiate the transaction including the encrypted payment data. The transaction processor computer can then decrypt the encrypted payment data and conduct the transaction.

Some embodiments can ensure the security of payment data passing through a payment device initiating a digital wallet payment transaction. By receiving encrypted payment data at the payment device, and decrypting the encrypted payment information at a transaction processor computer (e.g., a merchant computer or a merchant processor computer), embodiments can prevent the payment device from accessing clear-text payment data. Thus, even if the payment device is compromised by a malicious party, the payment data for the transaction will remain secure. Furthermore, since encryption, rather than tokenization, is used to protect the payment data, a token database does not need to be shared between a wallet provider and a merchant processor or other entity that is processing the transaction.

Some embodiments can further allow payment data passed through a payment device to be encrypted using a derived key generated from a base derivation key and a wallet serial number corresponding to a user's digital wallet. The derived key may therefore be unique to the digital wallet of the user. Using a unique derived key can provide additional security for the payment data, since a fraudster would require both the base derivation key and the user's wallet serial number to decrypt the payment data encrypted using the derived key. Furthermore, deriving the key using a base derivation key and the user's wallet serial number can reduce the number of keys that need to be stored by a transaction processor (such as a merchant computer or a merchant processor computer).

I. Systems

FIG. 1 shows a system 100 according to an embodiment of the invention. The system 100 comprises a user (not shown) who may operate a user payment device 200. The user may operate user payment device 200 in communication with a wallet provider computer 102 and a merchant computer 101 to conduct payment transactions. Alternatively, the user and/or a merchant may operate a merchant payment device 300 in communication with the wallet provider computer 102 and a merchant processor computer 103 to conduct payment transactions. As used herein, a "payment device" may include a mobile phone, tablet, netbook, laptop, desktop, point of sale (POS) terminal, kiosk, or any other suitable computing device. Merchant computer 101 may be connected to merchant processor computer 103. Merchant processor computer 103 may be connected to wallet provider computer 102 and acquirer computer 104. Acquirer computer 104 may be connected to issuer computer 106 via payment processing network 105.

Merchant computer 101 and merchant processor computer 103 may include any server computer(s) configured to conduct or process payment transactions for a merchant. For example, in some embodiments, merchant computer 101 may be a web server operable to receive a request to initiate a transaction from a user payment device 200 and generate an authorization request message for the transaction. In some embodiments, merchant processor computer 103 may be a server computer operable to receive a request to initiate a transaction from a merchant payment device 300 and generate an authorization request message for the transaction.

A wallet provider computer 102 may include any server computer configured to maintain digital wallets for one or more users. Wallet provider computer 102 may be configured to receive account credentials for a user's digital wallet and encrypt payment data associated with that wallet. In some embodiments, the payment data may be encrypted using a derived key, such as a key generated using the derived unique key per transaction (DUKPT) standard, as specified in ANSI X9.24 part 1. In some embodiments, wallet provider computer 102 may share one or more base derivation keys (BDKs) with merchant computer 101 and/or merchant processor computer 103 to allow merchant computer 101 and merchant processor computer 103 to decrypt payment data encrypted by wallet provider computer 102.

As used herein, an "issuer" may typically refer to a business entity (e.g., a bank) that maintains financial accounts for a user that may be stored in a digital wallet. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities may comprise one or more computer apparatuses (e.g., wallet provider computer 102, merchant processor computer 103, acquirer computer 104, payment processing network 105, and issuer computer 106) to enable communications, or to perform one or more of the functions described herein.

The payment processing network 105 may include data processing subsystems, networks, and operations used to support and deliver certificate authority services, authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 105 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 105 may use any suitable wired or wireless network, including the Internet.

In some payment transactions, the user purchases a good or service from a merchant using user payment device 200. For example, the user may use a merchant application installed on user payment device 200 to order items and enter a payment option (such as digital wallet credentials). The user's payment device 200 may then interact with merchant computer 101, such as a web server (such as during an e-commerce transaction) to initiate a request to conduct the transaction.

In other payment transactions, such as in-person transactions, the user may operate a merchant payment device 300 to conduct a transaction. For example, a merchant may provide the merchant payment device 300 to the user, and the user may enter credentials for the user's digital wallet into the merchant payment device 300. The merchant may then enter items to be purchased and request a merchant processor computer 103 to initiate a request to conduct the transaction.

An authorization request message for a transaction may be generated by user payment device 200, merchant payment device 300, merchant computer 101, or merchant processor computer 103, and then forwarded to the acquirer computer 104. After receiving the authorization request message, the authorization request message is then sent to the payment processing network 105. The payment processing network 105 then forwards the authorization request message to the corresponding issuer computer 106 associated with an issuer associated with the user.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 106 receives the authorization request message, the issuer computer 106 sends an authorization response message back to the payment processing network 105 to indicate whether the current transaction is authorized (or not authorized). The payment processing network 105 then forwards the authorization response message back to the acquirer computer 104. In some embodiments, payment processing network 105 may decline the transaction even if issuer computer 106 has authorized the transaction, for example depending on a value of the fraud risk score. The acquirer computer 104 then sends the response message back to the merchant processor computer 103 or the merchant computer 101. The merchant processor computer 103 or merchant computer 101 may provide the response message or a response status (e.g., success or failure) to merchant payment device 300 or user payment device 200.

An "authorization response message" may be an electronic message reply to an authorization request message generated by an issuing financial institution 106 or a payment processing network 105. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network 105) to the merchant computer 101 that indicates approval of the transaction. The code may serve as proof of authorization. As noted above, in some embodiments, a payment processing network 105 may generate or forward the authorization response message to the merchant.

After the merchant computer 101 or merchant processor computer 103 receives the authorization response message, the merchant computer 101 or merchant processor computer 103 may then provide the authorization response message for the user. The response message may be displayed by the user payment device 200 or merchant payment device 300, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by the payment processing network 103. A clearing process is a process of exchanging financial details between an acquirer and an issuer to facilitate posting to a customer's payment account and reconciliation of the user's settlement position.

It should be noted that although computers and networks 101-106 are shown separately in FIG. 1, in various embodiments, any or all of entities 101-106 may be combined and/or operated by the same entity. For example, in some embodiments, merchant processor computer 103 and/or acquirer computer 104 may be operated by payment processing network 105. In addition, systems in accordance with embodiments of the invention may be missing one or more of the depicted entities. For example, some embodiments may lack a merchant processor computer 103. Consequently, in some such embodiments, merchant computer 101 may directly communicate with acquirer computer 104.

Payment transactions in accordance with the invention may also be conducted in any other suitable manner. For example, instead of payment device 200 communicating with merchant computer 101, a user's portable user device (e.g., a credit card, debit card, or smart card) may be used at an access device (e.g., a point of sale (POS) terminal) connected to merchant computer 101.

A. User Payment Devices

Figure 2:
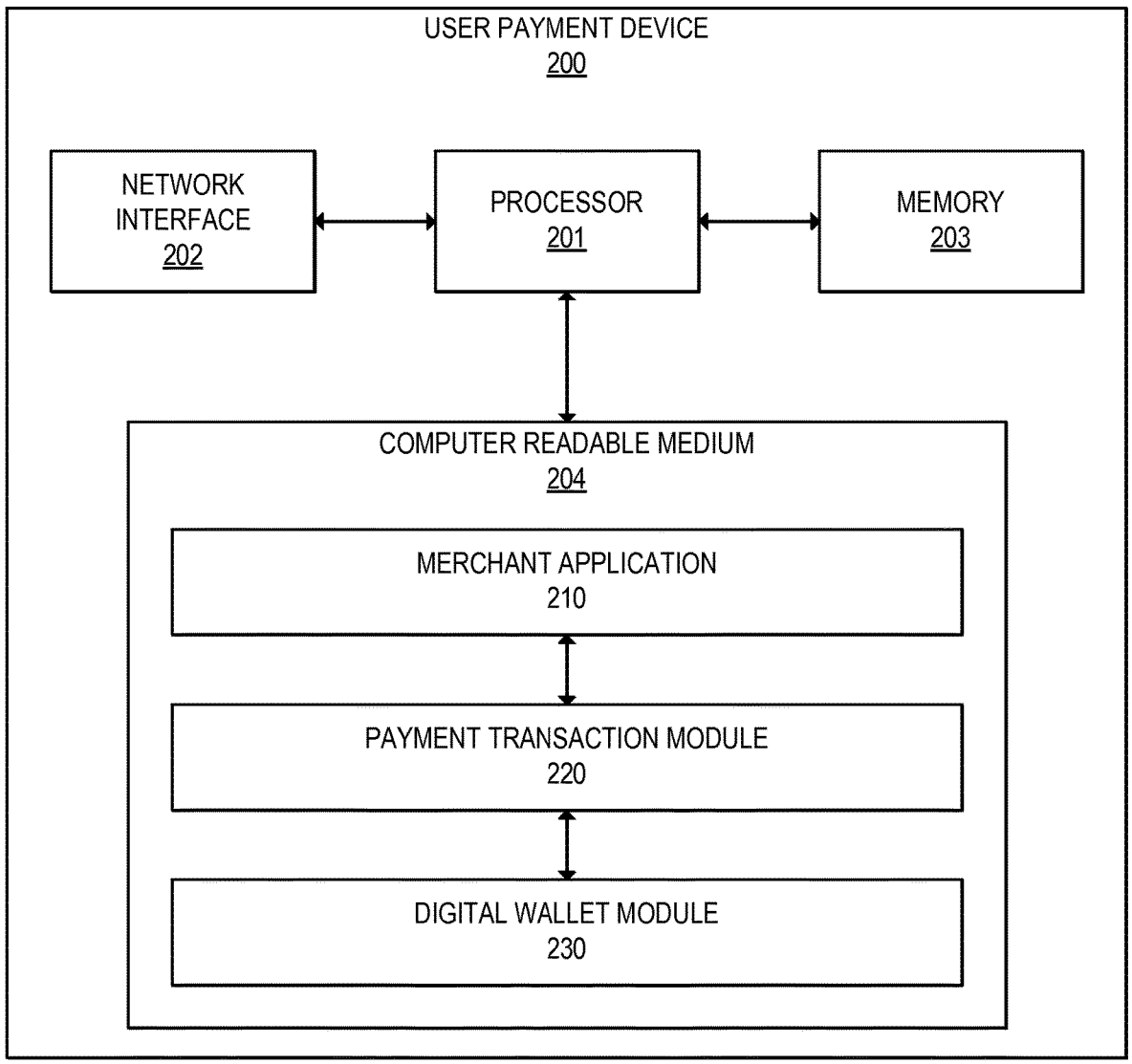
FIG. 2 shows a user payment device that may be used with embodiments of the invention.

FIG. 2 illustrates a user payment device 200 according to some embodiments of the invention. Examples of user payment devices 200 may include mobile phones, tablets, desktop and laptop computers, or any other computing device suitable for initiating payment transactions. User payment device 200 may include a processor 201 communicatively coupled to a network interface 202, a memory 203, and a computer readable medium 204.

The processor 201 can comprise one or more CPUs, each of which may comprise at least one processor cores operable to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. In some cases, processor 201 can include multiple CPUs coupled over a network, such as in a distributed or cluster computing system.

The network interface 202 may be configured to allow user payment device 200 to communicate with other entities such as merchant computer 101, wallet provider computer 102, etc. using one or more communications networks. Network interfaces may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); a secured custom connection; a Wide Area Network (WAN); a wireless network (e.g., employing protocols such as, but not limited to a Wireless Application Protocol (WAP), I-mode, and/or the like); and/or the like.

The memory 203 may be used to store data and code. The memory 203 may be coupled to the processor 201 internally or externally (e.g., cloud based data storage), and may comprise any combination of volatile and/or non-volatile memory, such as RAM, DRAM, ROM, flash, or any other suitable memory device.

The computer-readable medium 204 may be in the form of a memory (e.g., flash, ROM, etc.) and may comprise code, executable by the processor 201 for implementing the methods described herein. The computer readable medium 204 may include a mobile application 210, a payment transaction module 220, and a digital wallet module 230.

Merchant application 210 may include any mobile program, app, software, or other code suitable to purchase goods or services from a merchant. Typically, merchant application 210 may be a merchant-specific application or program. Alternatively, merchant application 210 can be general purpose, such as a web browser that accesses a merchant's website. Merchant application 210 may include a user interface to browse for and select goods or services to be purchased. Merchant application 210 may determine various transaction data for a transaction, such as the goods or services to be purchased, an amount for the transaction, user information (e.g., name and shipping address), etc.

Payment transaction module 220 may include any API, service, application, applet, module, or other executable code configured to process payment for merchant application 210. For example, once a user has entered in merchant application 210 goods and services to be purchased, merchant application 210 may use payment transaction module 220 to prompt the user for an acceptable payment method (e.g., credit card, debit card, digital wallet, etc.). In some embodiments, payment transaction module 220 may be configured to initiate transactions in a selected payment method.

Digital wallet module 230 may include any API, service, application, applet, or other executable code configured to conduct a payment transaction using a digital wallet. In various embodiments, if a digital wallet payment transaction is to be conducted, payment transaction module 220 may communicate with digital wallet module 230 to prompt a user for digital wallet credentials, send the user credentials to wallet provider computer 102, and receive encrypted payment data from wallet provider computer 102.

B. Merchant Payment Devices

Figure 3:
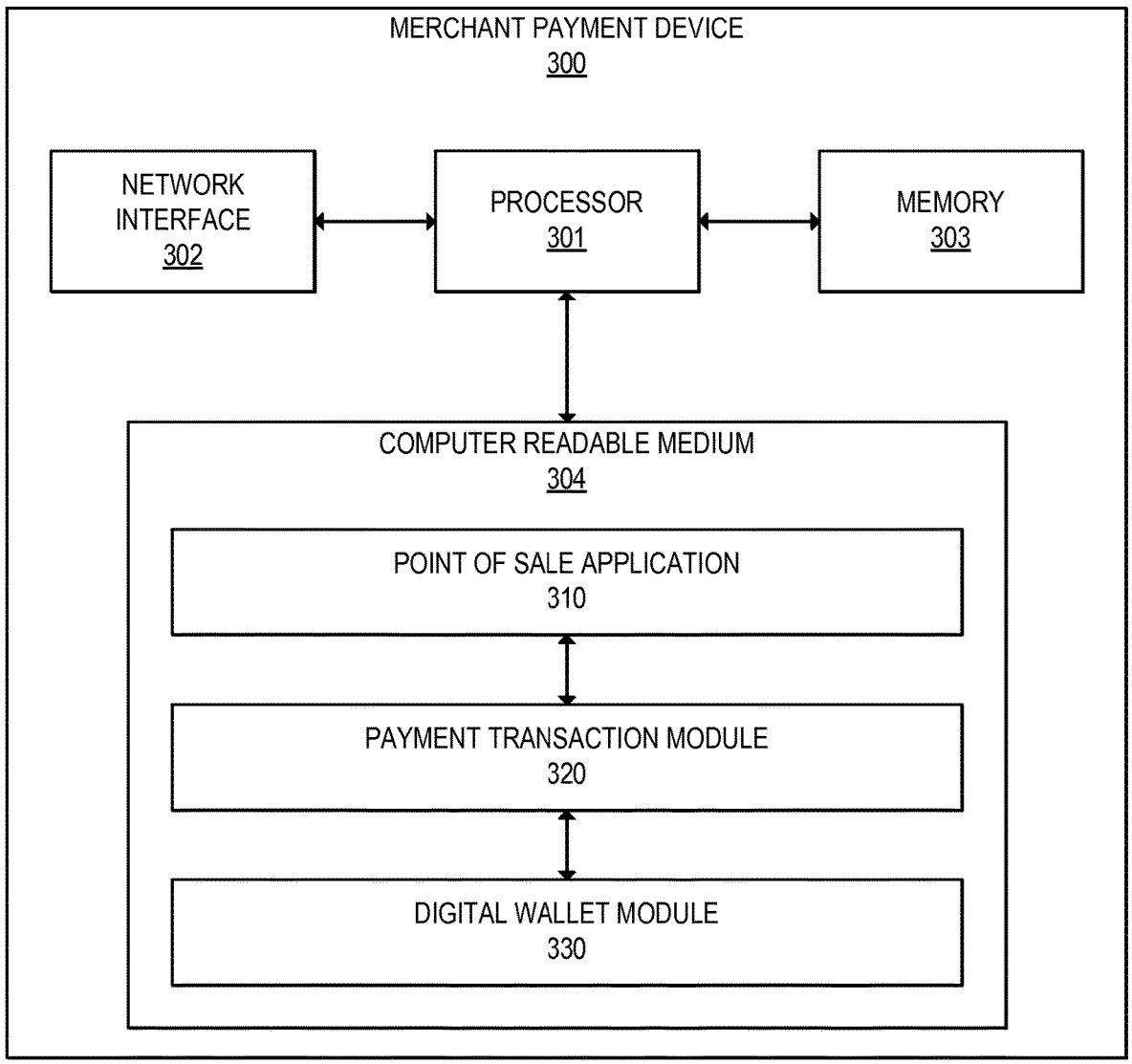
FIG. 3 shows a merchant payment device that may be used with embodiments of the invention.

FIG. 3 illustrates a mobile payment device 300 according to some embodiments of the invention. Examples of mobile payment devices 300 may include mobile phones, tablets, desktop and laptop computers, point of sale (POS) terminals, or any other merchant computing device suitable for initiating payment transactions. Merchant payment device 300 may include a processor 301 communicatively coupled to a network interface 302, a memory 303, and a computer readable medium 304.

The processor 301 can comprise one or more CPUs, each of which may comprise at least one processor cores operable to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. In some cases, processor 301 can include multiple CPUs coupled over a network, such as in a distributed or cluster computing system.

The network interface 302 may be configured to allow merchant payment device 300 to communicate with other entities such as wallet provider computer 102, merchant processor computer 103, etc. using one or more communications networks. Network interfaces may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); a secured custom connection; a Wide Area Network (WAN); a wireless network (e.g., employing protocols such as, but not limited to a Wireless Application Protocol (WAP), I-mode, and/or the like); and/or the like.

The memory 303 may be used to store data and code. The memory 303 may be coupled to the processor 301 internally or externally (e.g., cloud based data storage), and may comprise any combination of volatile and/or non-volatile memory, such as RAM, DRAM, ROM, flash, or any other suitable memory device.

The computer-readable medium 304 may be in the form of a memory (e.g., flash, ROM, etc.) and may comprise code, executable by the processor 301 for implementing the methods described herein. The computer readable medium 304 may include a mobile application 310, a payment transaction module 320, and a digital wallet module 330.

Point of sale application 310 may include any mobile program, app, software, or other code suitable to initiate a payment transaction. In some embodiments, point of sale application 310 may be a merchant-specific application. In other embodiments, point of sale application 310 may be general purpose point of sale (POS) software, such as a mobile point of sale (mPOS) application. Point of sale application 310 may include user and/or merchant interfaces to enter goods or services to be purchased. Point of sale application 310 may determine various transaction data for a transaction, such as the goods or services to be purchased, an amount for the transaction, user information (e.g., name and shipping address), etc.

Payment transaction module 320 may include any API, service, application, applet, module, or other executable code configured to process payment for point of sale application 310. For example, once a user has entered in point of sale application 310 goods and services to be purchased, point of sale application 310 may use payment transaction module 320 to prompt the user for an acceptable payment method (e.g., credit card, debit card, digital wallet, etc.). In some embodiments, payment transaction module 320 may be configured to initiate transactions in a selected payment method.

Digital wallet module 330 may include any API, service, application, applet, or other executable code configured to conduct a payment transaction using a digital wallet. In various embodiments, if a digital wallet payment transaction is to be conducted, payment transaction module 320 may communicate with digital wallet module 330 to prompt a user for digital wallet credentials, send the user credentials to a wallet provider computer 102, and receive encrypted payment data from wallet provider computer 102.

It should be noted that although applications 210 and 310, payment transaction modules 220 and 320, and digital wallet modules 230 and 330 are shown separately for user payment device 200 and merchant payment device 300, respectively, the applications and modules may be combined in any suitable manner. For example, a merchant application 210 may include payment transaction module 220 and digital wallet module 230. Alternatively, payment transaction module 220 and digital wallet module 230 may be shared libraries used by multiple merchant applications 210 for different merchants.

II. METHODS

The systems described above can be used to conduct digital wallet payment transactions. In some embodiments, the transactions may be initiated by a payment device, such as user payment device 200 or merchant payment device 300. In addition, in some embodiments, the transactions may be processed by a transaction processor computer, such as merchant computer 101 or merchant processor computer 103.

A. Digital Wallet Transaction Methods

Figure 4:
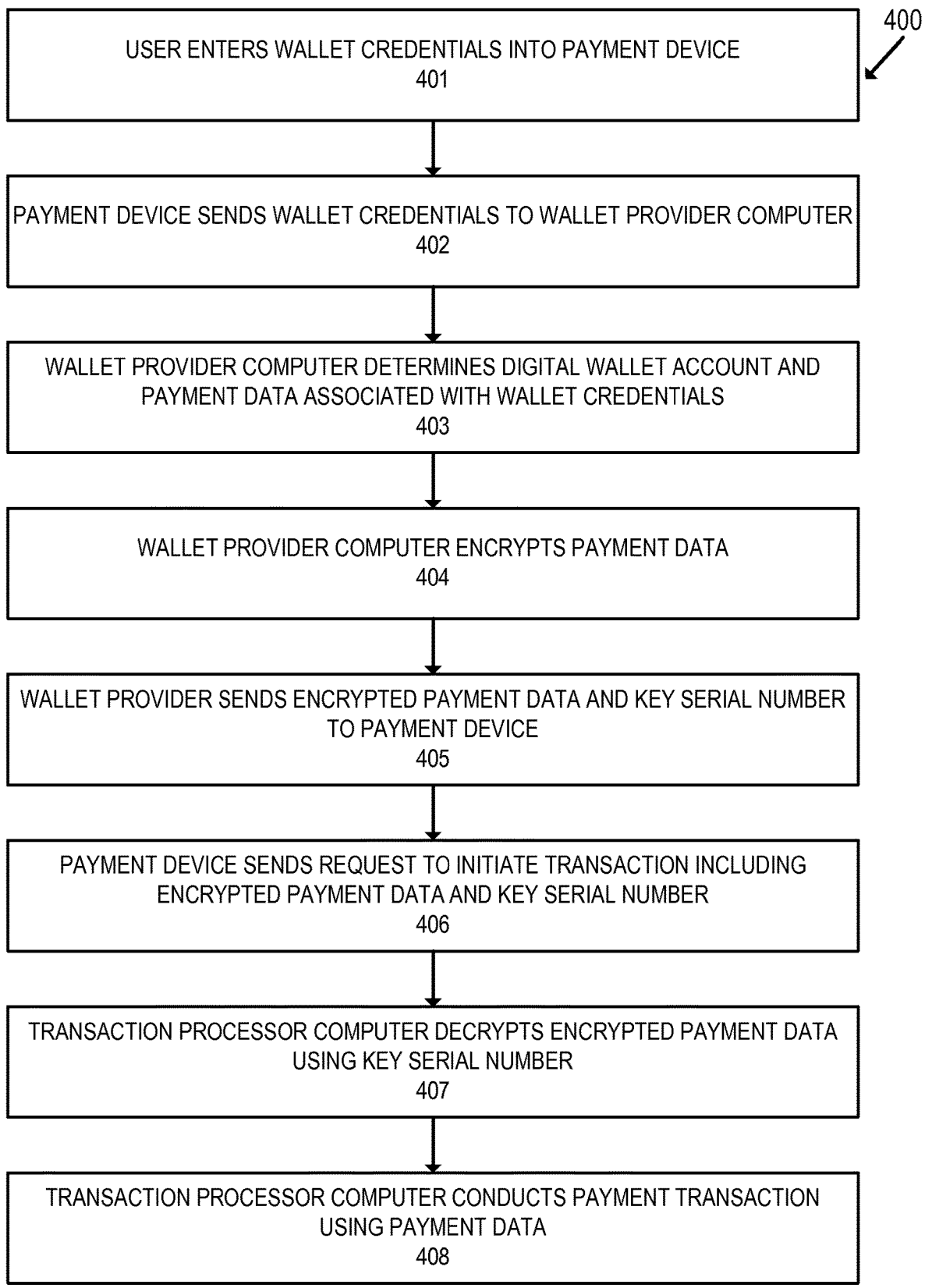
FIG. 4 shows a method for conducting a digital wallet payment transaction in a system comprising a payment device, a wallet provider computer, and a transaction processor computer.

FIG. 4 shows a method 400 for conducting a digital wallet payment transaction in a system comprising a payment device, a wallet provider computer 102, and a transaction processor computer. Method 400 may be performed when transaction data (e.g., goods or services to be purchased, user information, etc.) for a transaction is determined, and a user or merchant indicates to a payment device to initiate the transaction.

At step 401, a user enters wallet credentials into the payment device. The term "wallet credentials" may include any information suitable to authorize the user to access a digital wallet. For example, wallet credentials may comprise an identifier corresponding to the wallet provider associated with the user's digital wallet, a username and password, a token, or biometric data. In some embodiments, the wallet credentials may include a one-time password.

At step 402, the payment device sends the wallet credentials to a wallet provider computer 102. In some embodiments, such as in systems comprising multiple wallet provider computers, the appropriate wallet provider computer 102 may be determined using the wallet credentials entered by the user. As another example, the appropriate wallet provider computer 102 can be selected by a user.

At step 403, wallet provider computer 102 determines a digital wallet account and payment information associated with the received wallet credentials. In some embodiments, the wallet provider computer 102 may first verify the wallet credentials. If the wallet credentials are authenticated, the wallet provider computer 102 may retrieve the digital wallet account associated with the wallet credentials. The digital wallet account may comprise a wallet serial number uniquely identifying the digital wallet, a number of transactions conducted using the digital wallet, payment data associated with the digital wallet, or any other suitable data. Payment data for the digital wallet may include a primary account number (PAN), an expiration date of the PAN or account, a bank account number, a bank routing number, or any other information suitable to authorize a payment transaction.

At step 404, wallet provider computer 102 encrypts the retrieved payment data. The retrieved payment data may be encrypted in any suitable manner. In some embodiments, the payment data may be encrypted using an encryption key stored on wallet provider computer that corresponds to the user's digital wallet. In other embodiments, the payment data may be encrypted using a derived key. For example, the derived key may be generated from a base derivation key, a wallet serial number, and a transaction counter. The "base derivation key" (BDK) may include any suitable encryption key. Typically, the BDK can be a key associated with a wallet provider and may be used for multiple digital wallets managed by wallet provider computer 102 (or may be specific to one digital wallet). The BDK may be shared with trusted entities, such as transaction processor computers (e.g., merchant computer 101 or merchant processor computer 103). The "wallet serial number" may include any number, string, or other identifier uniquely identifying the digital wallet. The "transaction counter" may include any count or string representing a number of transactions conducted using the digital wallet. Typically, the transaction counter may be an integer that is incremented each time the transaction is conducted. In some embodiments, the wallet serial number and transaction counter may have a fixed bit-length.

The payment data may be encrypted in any suitable manner. For example, in some embodiments, a derived key unique to the transaction may be generated from the BDK, wallet serial number, and transaction counter. Any suitable key derivation function may be used to generate the derived key, such as a KDF described in the derived unique key per transaction (DUKPT) standard as specified in ANSI X9.24 part 1. The derived key may then be used to encrypt the payment information.

At step 405, wallet provider computer 102 sends the encrypted payment data and a key serial number to the payment device. A "key serial number" (KSN) may include one or more of the wallet serial number, the transaction counter, a BDK identifier, or any other information used to decrypt the encrypted payment data.

At step 406, the payment device sends a request to initiate a transaction including the encrypted payment data and the KSN to a transaction processor computer. A "transaction processor computer" may include any server computer operable to decrypt the encrypted payment data and conduct a payment transaction. In some embodiments, if the payment device is a user payment device 200, the transaction processor computer may be a merchant computer 101. In some embodiments, if the payment device is a merchant payment device 300, the transaction processor computer may be a merchant processor computer 102. In some embodiments, the payment device may include transaction data in the request.

At step 407, the transaction processor computer decrypts the encrypted payment data using the received KSN. For example, in some embodiments, the transaction processor computer may use a BDK identifier included in the KSN to retrieve a BDK associated with the encrypted payment information. The transaction processor computer may then generate a derived key using the BDK, the wallet serial number included in the KSN, and the transaction counter included in the KSN. The derived key may then be used to decrypt the encrypted payment information.

In some embodiments, an entity other than the transaction processor computer may decrypt the encrypted payment data. For example, the transaction processor computer may forward the encrypted payment data to wallet provider computer 102, acquirer computer 104, payment processing network 105, or issuer computer 106. The decrypted payment information may then be returned to the transaction processor computer.

At step 408, the transaction processor computer conducts the payment transaction. For example, the transaction processor computer may generate and send an authorization request message including the payment data to an acquirer computer. The authorization request message may be compliant with the ISO 8583 standard.

It should be noted that although embodiments of the invention are described using method 400 above, embodiments are not so limited. For example, at step 404, payment data may be encrypted without using a BDK, wallet serial number, or transaction counter. Rather, in some embodiments, the payment data may be encrypted using another suitable encryption key. In other embodiments, the payment data may not be encrypted at all (i.e., it may be transmitted in cleartext).

B. Payment Device Methods

In some embodiments of the invention, a payment device may be used to request encrypted payment data from a wallet provider computer 102, and use the encrypted payment data to initiate a transaction. For instance, a user may operate a user payment device 200 to initiate the transaction. Alternatively, a user and/or merchant may use a merchant payment device 300 to initiate the transaction.

Figure 5:
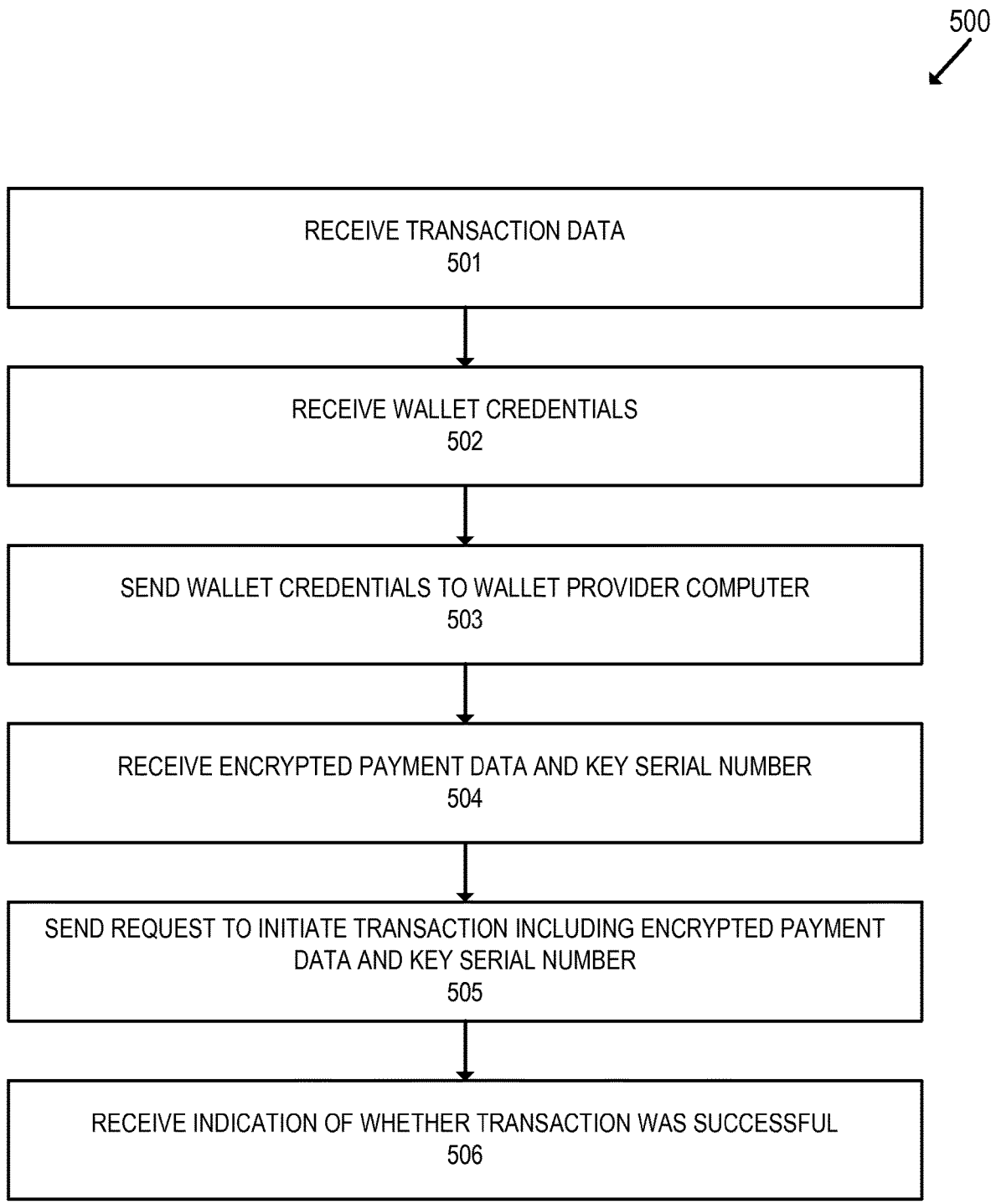
FIG. 5 shows a method of initiating a digital wallet payment transaction using a payment device.

FIG. 5 shows a method 500 for conducting a digital wallet payment transaction from the perspective of a payment device.

At step 501, transaction data for a transaction is received. Transaction data may include any information relating to a transaction, such as goods or services to be purchased, a price associated with each good or service, a total amount for the transaction, user information (such as the user's name and mailing address), or any other suitable information. In some cases, transaction data may be received over a network. For example, if a user payment device 200 is used to browse a merchant website, a user's account information and a shopping cart comprising goods to be purchased may be transmitted to user payment device 200. In other cases, transaction data may be entered using an input device. For example, if merchant payment device 300 is a mobile POS, the merchant may manually enter goods to be purchased, or may scan the items into merchant payment device 300 (e.g., using a barcode scanner).

At step 502, wallet credentials for a user's digital wallet are received. In some cases, the wallet credentials may be directly entered by a user. For example, a merchant may present a merchant payment device 300 to the user, and instruct the user to enter their wallet credentials. In other cases, the wallet credentials may have been previously stored on the payment device, e.g., when user payment device 200 is used. In yet other cases, the wallet credentials may be received by the payment device over a network connection, such as the Internet.

At step 503, the wallet credentials are send to a wallet provider computer 102. In some embodiments, such as in systems comprising multiple wallet provider computers, the appropriate wallet provider computer 102 may be determined using the wallet credentials entered by the user. For example, the wallet credentials may include a name of the wallet provider, or information that may be used to derive the appropriate wallet provider. In other embodiments, the user can selected a wallet provider from a set of wallet providers, e.g., using a GUI. The wallet credentials may be sent in response to a "send" button being activated by a user on a screen of the payment device.

At step 504, encrypted payment data and a key serial number are received from the wallet provider computer 102. The encrypted payment data may include any data encrypted using one or more encryption keys. Typically, the encryption key(s) used to encrypt the payment data are not known to the payment device. The key serial number (KSN) may include one or more of a wallet serial number associated with the user's digital wallet, a transaction counter corresponding to the number of transactions conducted by the digital wallet, a BDK identifier that can be used to identify a base derivation key, or any other information used to decrypt the encrypted payment data.

At step 505, a request to initiate the transaction is sent to transaction processor computer, such as merchant computer 101 or merchant processor computer 103. The request to initiate the transaction may include the encrypted payment data and the key serial number received from wallet provider computer 102 at step 504. The request can be sent in a same or similar manner as requests that do not involve a digital wallet provider. In this manner, a same infrastructure can be used.

At step 506, an indication of whether the transaction was successful is received. In this manner, the payment device can be involved in an encrypted payment transaction without having to manage encryption keys. Typically, a POS would need to manage encryption keys. The digital wallet provider can manage the keys. Additional infrastructure for communicating with the wallet provider as part of a transaction is not needed, since the encrypted payment data is sent via the payment device, as occurs when the POS does encrypt the data and manage encryption keys.

C. Transaction Processor Methods

In some embodiments of the invention, a transaction processor computer may receive a request to initiate a transaction that includes encrypted payment data. The transaction processor computer may then decrypt the payment data and conduct the transaction. In various embodiments of the invention, the transaction processing computer may be a merchant computer 101, a merchant processor computer 103, or any other suitable payment device.

Figure 6:
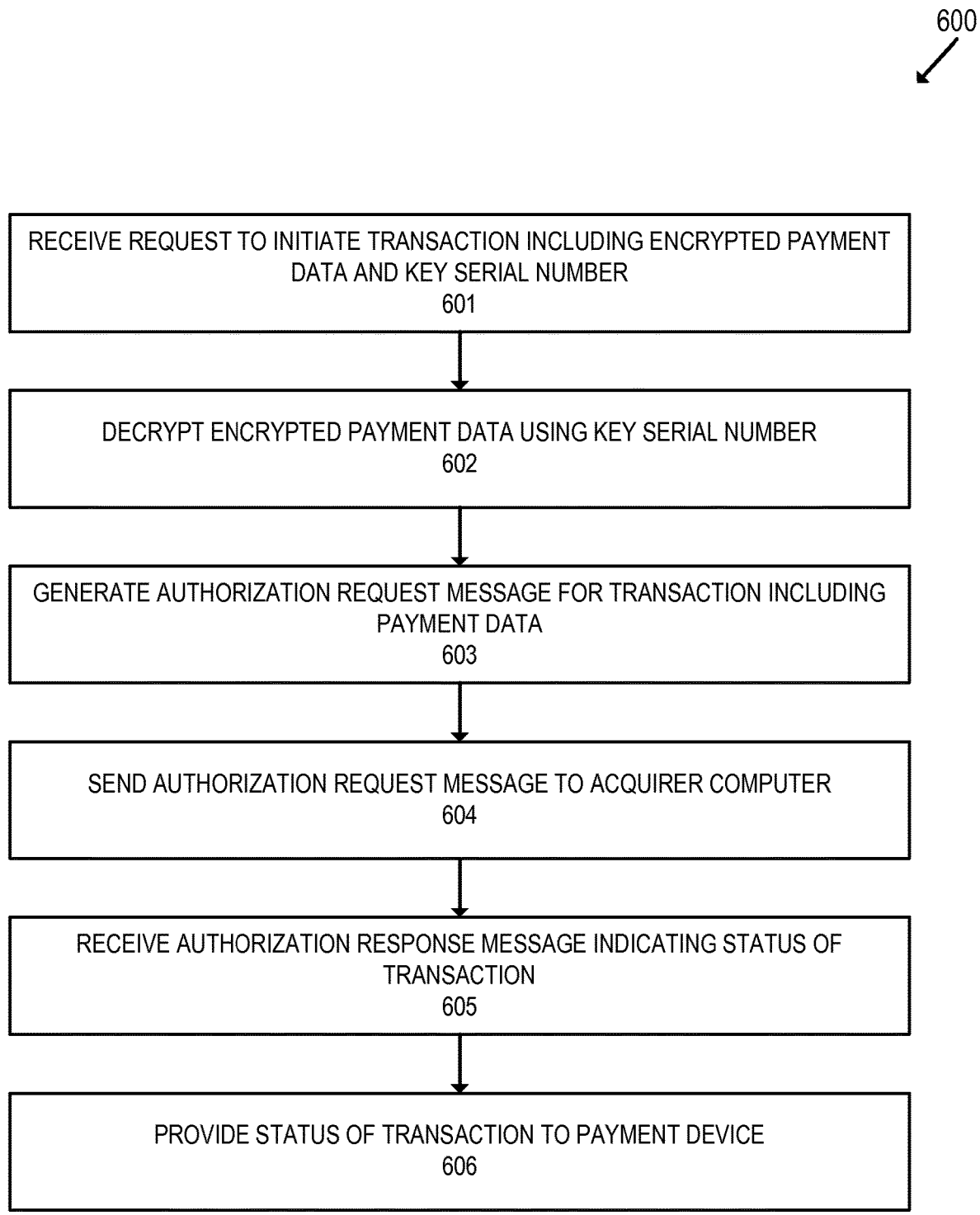
FIG. 6 shows a method of conducting a digital wallet payment transaction using a transaction processor computer.

FIG. 6 shows a method 600 for conducting a digital wallet payment transaction from the perspective of a transaction processor computer.

At step 601, a request to initiate the transaction is received. The request to initiate the transaction may be received from a payment device, such as user payment device 200 or merchant payment device 300. The request to initiate the transaction includes encrypted payment data and a key serial number. In some embodiments, the key serial number may include one or more of a wallet serial number associated with the user's digital wallet, a transaction counter corresponding to the number of transactions conducted by the digital wallet, a BDK identifier that can be used to identify a base derivation key, or any other information used to decrypt the encrypted payment data.

At step 602, the encrypted payment data is decrypted using the key serial number. In some embodiments, decrypting the encrypted payment data may comprise retrieving a base derivation key using a BDK identifier included in the key serial number. The BDK and wallet serial number can then be used as inputs into a key derivation function that produces a derived encryption key. The derived key can then be used to decrypt the encrypted payment data. In some embodiments, a transaction counter can also be used as an input into the key derivation function. In such embodiments, the derived key may be unique to both the digital wallet (via the wallet serial number) and the current transaction (via the transaction identifier). In some embodiments, the derived key may be generated in accordance with the derived unique key per transaction (DUKPT) standard, as specified in ANSI X9.24 part 1.

At step 603, an authorization request message is generated for the transaction. The authorization request message includes the decrypted payment data, which may comprise a primary account number (PAN), an expiration date of the payment data, a card verification code (e.g., a dCVV), a cryptogram, or any other data suitable to conduct a payment transaction. In some embodiments, the authorization request message may be formatted in accordance with ISO standard 8583, so that it may be transmitted via payment processing networks such as Visa™ and MasterCard™.

At step 604, the authorization request message is sent to an acquirer computer 104. In some embodiments, the acquirer computer 104 may be associated with an acquirer that maintains a merchant account for the merchant or merchant processor conducting the transaction. The authorization request message may then be forwarded from acquirer computer 104 to payment processing network 105, and from payment processing network 105 to issuer computer 106. In response to receiving the authorization request message, payment processing network 105 and/or issuer computer 106 may determine whether the transaction is authorized, and transmit an authorization response message back to acquirer computer 104. Acquirer computer 104 may then forward the authorization response message to the transaction processor computer. The operation of the acquirer computer 104, payment processing network 105, and issuer computer 106 in processing a payment transaction in some embodiments is further described above with reference to FIG. 1.

At step 605, an authorization response message is received indicating the status of the transaction. For example, in some embodiments, the authorization response message may include a status code that indicates that the transaction has been "Accepted" (i.e., approved), "Rejected" (i.e., declined), or held for further review or processing.

At step 606, the status of the transaction is provided to the payment device. For example, the transaction processor computer may transmit a message to the payment device in response to the received request to initiate the transaction. Subsequently, the payment device may display to the merchant and/or user that the transaction was successful or unsuccessful, depending on the received status.

III. Payment Flows

Figure 7:
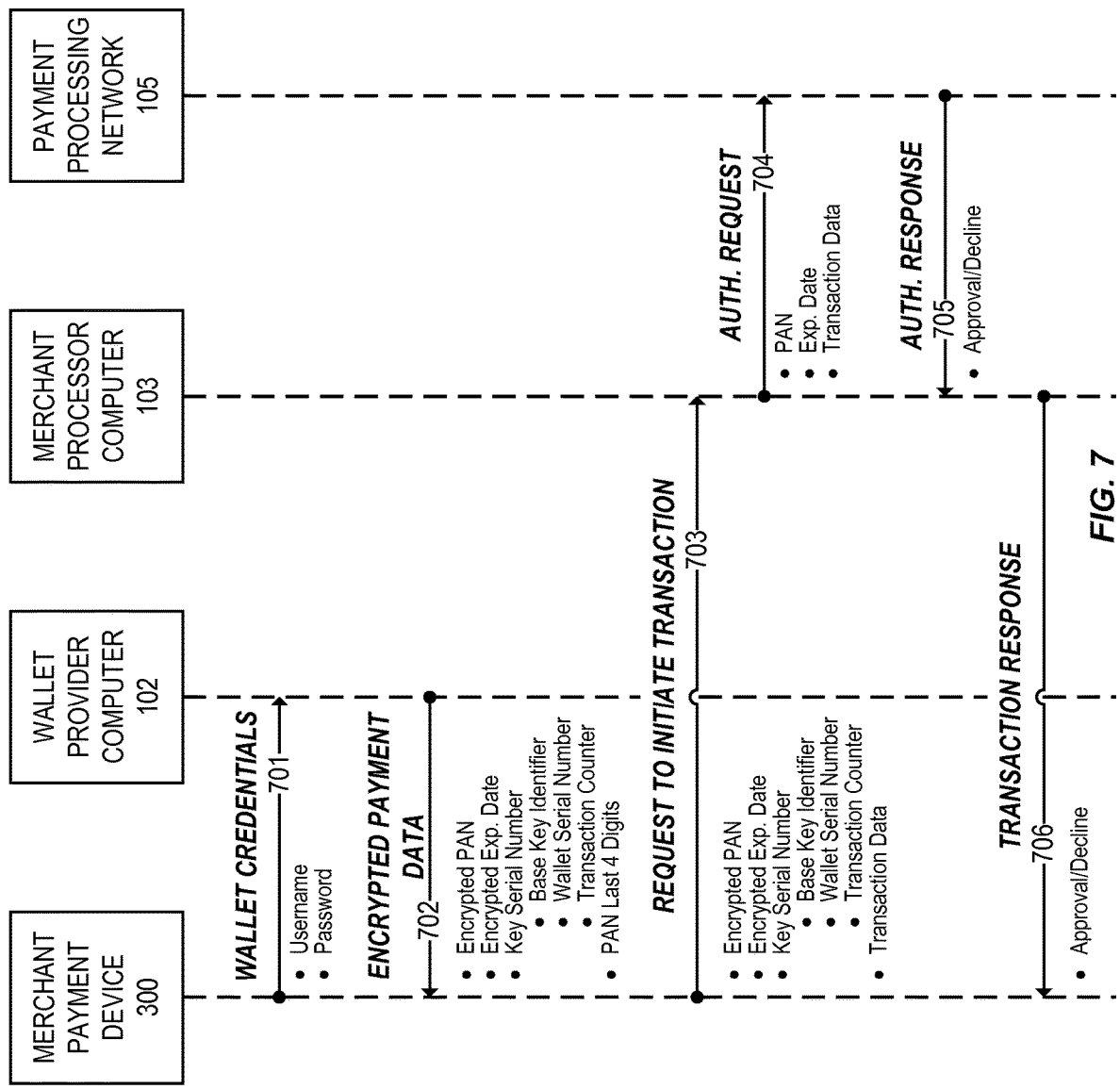
FIG. 7 shows a flow diagram illustrating a method for conducting a digital wallet payment transaction using a merchant payment device.
Figure 8:
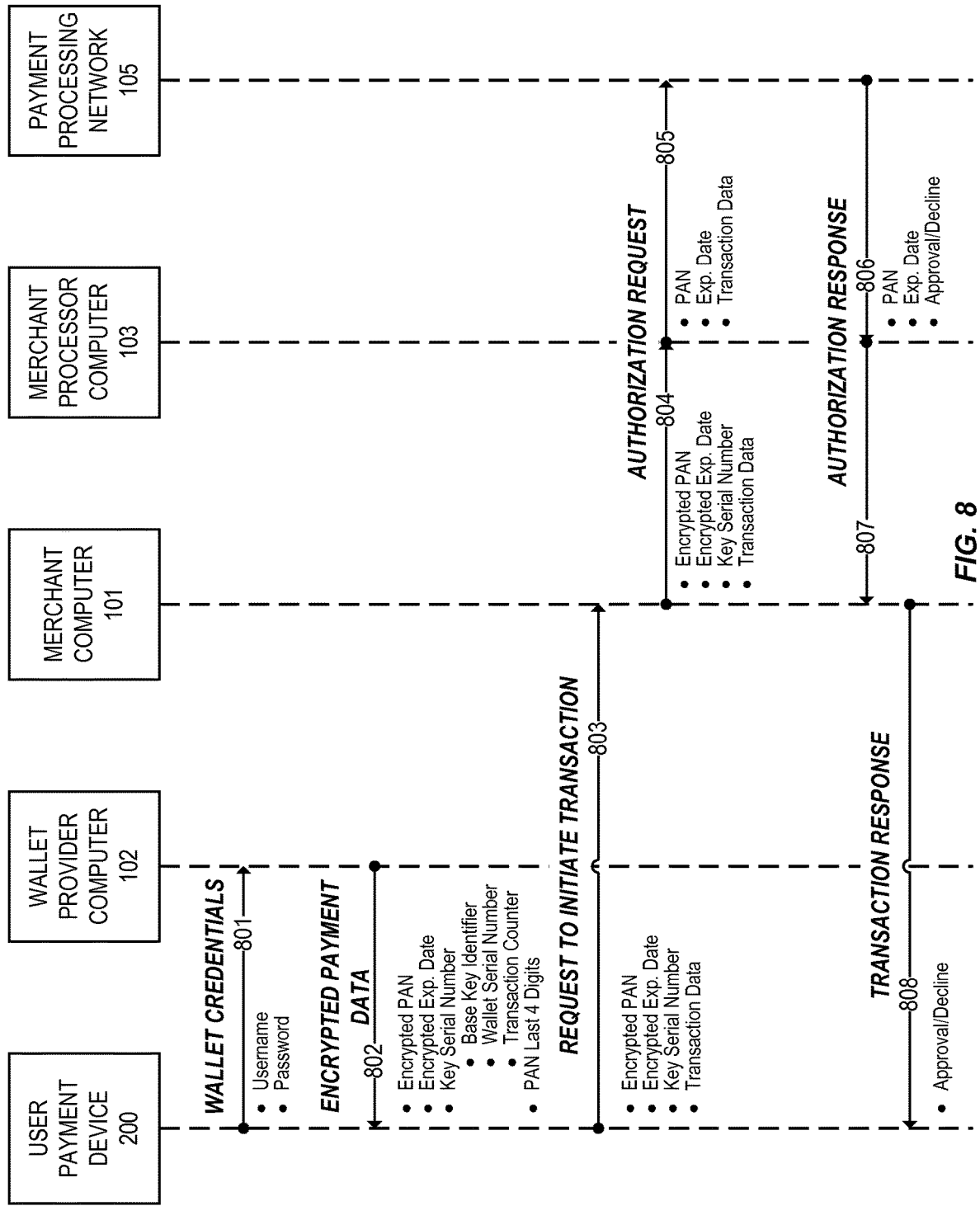
FIG. 8 shows a flow diagram illustrating a method for conducting a digital wallet payment transaction using a user payment device.

Embodiments of the invention can allow digital wallet payment transactions to be conducted with any suitable payment system comprising a payment device and a transaction processor computer. FIGS. 7 and 8 described below each illustrate transactions conducted using a payment system.

A. Example Merchant Payment Flow

FIG. 7 shows a flow diagram illustrating a method for conducting a digital wallet payment transaction using a merchant payment device 300. The flow of FIG. 7 may be performed, for example, in a "card present" transaction in which a user interacts with a physical merchant.

At step 701, merchant payment device 300 provides wallet credentials to wallet provider computer 102. The wallet credentials may include a username and a password associated with a user's digital wallet account. In some embodiments, merchant payment device 300 may obtain the wallet credentials by prompting a user to enter the credentials into merchant payment device 300. For example, if merchant payment device 300 is a tablet computer, merchant payment device 300 may display an on-screen keyboard for the user to enter their wallet credentials.

At step 702, wallet provider computer 102 verifies the received credentials, encrypts payment data associated with the digital wallet account, and returns to merchant payment device 300 the encrypted payment data, a key serial number, and the last four digits of the PAN. As shown in FIG. 7, the encrypted payment data includes an encrypted PAN and an encrypted expiration date. The key serial number comprises a base key identifier, a wallet serial number, and a transaction counter.

In some embodiments, further data may be added to the key serial number. Such embodiments can improve security by increasing the difficulty of re-generating a derived key used to encrypt the transaction data. For example, in some embodiments, the key serial number may further comprise a one-time password, or may make reference to a shared secret known to entities authorized to decrypt the encrypted payment data.

At step 703, merchant payment device 300 sends a request to initiate a transaction to merchant processor computer 103. Merchant processor computer 103 may be any computer configured to process merchant transactions. Examples of merchant processors may include Cybersource™ and Authorize.Net™. In this example, the request to initiate the transaction includes the encrypted PAN, the encrypted expiration date, the key serial number, and transaction data for the transaction. In some embodiments, transaction data may consist solely of a transaction amount for the transaction. In other embodiments, transaction data may include a transaction amount, a user's name, the users shipping and/or billing address, and/or any other suitable information.

At step 704, merchant payment computer 103 decrypts the encrypted PAN and expiration date and generates an authorization request message for the transaction. In some embodiments, decrypting the encrypted PAN and encrypted expiration date may comprise retrieving a base derivation key using a base key identifier included in the key serial number, providing the base derivation key, the wallet serial number, and the transaction counter as inputs to a key derivation function to generate a derived key, and using the derived key to decrypt the encrypted PAN and expiration date.

In some embodiments, the authorization request message may include the PAN, the expiration date, and at least a subset of the transaction data. Merchant payment computer 103 sends the authorization request via a payment processing network 105, although the authorization request message may be passed through an acquirer computer 104 and/or an issuer computer 106.

At step 705, payment processing network 105 returns an authorization response message to merchant processor computer 103. The authorization response message includes an indication of the status of the transaction (e.g., whether the transaction was approved or declined).

At step 706, merchant processor computer 103 sends a transaction response with the authorization status to merchant payment device 300. Merchant payment device 300 may then display to the user and/or merchant the status of the transaction.

B. Example User Payment Flow

FIG. 8 shows a flow diagram illustrating a method for conducting a digital wallet payment transaction using a user payment device 200. The flow of FIG. 8 may be performed, for example, in an online e-commerce transaction in which a user payment device 200 electronically communicates with a merchant.

At step 801, user payment device 300 provides wallet credentials to wallet provider computer 102. The wallet credentials may include a username and a password associated with a user's digital wallet account. In some embodiments, user payment device 200 may obtain the wallet credentials by prompting a user to enter the credentials into user payment device 200. For example, if user payment device 300 is a tablet computer, user payment device 200 may display a log-in screen for the user to enter their wallet credentials.

At step 802, wallet provider computer 102 verifies the received credentials, encrypts payment data associated with the digital wallet account, and returns to user payment device 200 the encrypted payment data, a key serial number, and the last four digits of the PAN. As shown in FIG. 8, the encrypted payment data includes an encrypted PAN and an encrypted expiration date. The key serial number comprises a base key identifier, a wallet serial number, and a transaction counter.

At step 803, user payment device 200 sends a request to initiate a transaction to merchant computer 101. Merchant computer 101 may be any computer operated by or on behalf of a merchant. For example, merchant computer 101 may be a web server or other server computer operated by the merchant. The request to initiate the transaction includes the encrypted PAN, the encrypted expiration date, the key serial number, and transaction data for the transaction. In some embodiments, transaction data may consist solely of a transaction amount for the transaction. In other embodiments, transaction data may include a transaction amount, a user's name, the users shipping and/or billing address, and/or any other suitable information.

At step 804, merchant computer 101 decrypts the encrypted PAN and expiration date and generates an authorization request message for the transaction. The authorization request message includes the PAN, the expiration date, and at least a subset of the transaction data. Merchant computer 101 sends the authorization request to merchant processor computer 103. At step 805, merchant processor computer 105 forwards the authorization request message to payment processing network 105. In some embodiments, the authorization request message may also pass through an acquirer computer 104 and/or an issuer computer 106.

At steps 806 and 807, payment processing network 105 returns an authorization response message to merchant computer 101 via merchant processor computer 103. The authorization response message includes an indication of the status of the transaction (e.g., whether the transaction was approved or declined).

At step 808, merchant computer 101 sends a transaction response with the authorization status to user payment device 200. User payment device 200 may then display to the user and/or merchant the status of the transaction.

IV. Computer Apparatus

Figure 9:
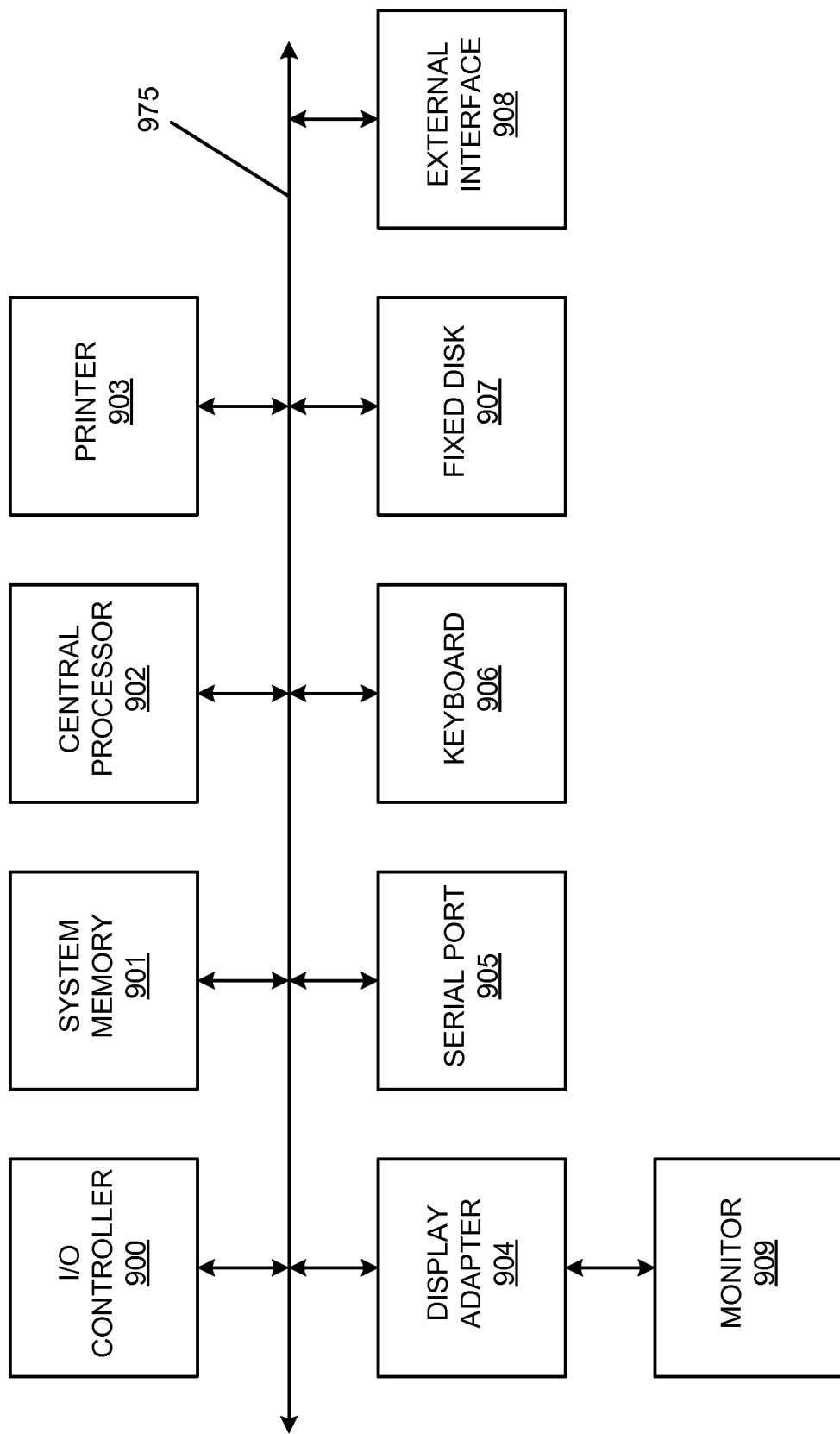
FIG. 9 shows a block diagram of an exemplary computer apparatus.

FIG. 9 is a high level block diagram of a computer system that may be used to implement any of the entities or components described above. The subsystems shown in FIG. 9 are interconnected via a system bus 975. Additional subsystems include a printer 903, keyboard 906, fixed disk 907, and monitor 909, which is coupled to display adapter 904. Peripherals and input/output (I/O) devices, which couple to I/O controller 900, can be connected to the computer system by any number of means known in the art, such as a serial port. For example, serial port 905 or external interface 908 can be used to connect the computer apparatus to a wide area network such as the Internet, a mouse input device, or a scanner. The interconnection via system bus 975 allows the central processor 902 to communicate with each subsystem and to control the execution of instructions from system memory 901 or the fixed disk 907, as well as the exchange of information between subsystems. The system memory 901 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A server computer comprising:
   a processor; and
   a computer-readable medium comprising code executable by the processor to implement a method comprising:
      storing one or more base derivation keys;
      receiving a request to initiate a transaction from a payment device, the request to initiate the transaction comprising:
         encrypted payment data, and
         a key serial number including a base derivation key identifier and a wallet serial number corresponding to a digital wallet, wherein the payment device received the encrypted payment data and the wallet serial number from a wallet provider computer;
      determining a base derivation key from the stored one or more base derivation keys using the base derivation key identifier;
      deriving a key using the base derivation key and the wallet serial number to generate a derived key;
      decrypting the encrypted payment data using the derived key that is generated using (1) the base derivation key determined from the base derivation key identifier received from the payment device and (2) the wallet serial number received from the payment device to determine payment data associated with the digital wallet;
      generating an authorization request message based on the encrypted payment data that is decrypted to obtain the payment data; and
      conducting the transaction using the payment data.

2. The server computer of claim 1, wherein the method further comprises:
   prior to receiving the request to initiate the transaction, establishing the base derivation key between the server computer and a digital wallet computer.

3. The server computer of claim 1, wherein the encrypted payment data is generated by the wallet provider computer in response to receiving user credentials for the digital wallet from the payment device.

4. A computer-implemented method comprising:
   storing one or more base derivation keys;
   receiving, by a server computer, a request to initiate a transaction from a payment device, the request to initiate the transaction comprising encrypted payment data and a key serial number including a base derivation key identifier and a wallet serial number corresponding to a digital wallet of a user, wherein the payment device received the encrypted payment data and the wallet serial number from a wallet provider computer;
   determining, by the server computer, a base derivation key from the stored one or more base derivation keys using the base derivation key identifier;
   deriving a key, by the server computer, using the base derivation key and the wallet serial number to generate a derived key;
   decrypting, by the server computer, the encrypted payment data using the derived key that is generated using (1) the base derivation key determined from the base derivation key identifier received from the payment device and (2) the wallet serial number received from the payment device to determine payment data associated with the digital wallet;
   generating an authorization request message based on the encrypted payment data that is decrypted to obtain the payment data; and
   conducting, by the server computer, the transaction using the payment data.

5. The computer-implemented method of claim 4, wherein the payment device is a user payment device, and wherein the server computer is a merchant computer.

6. The computer-implemented method of claim 4, wherein the payment device is a merchant payment device, and wherein the server computer is a merchant processor computer.

7. The computer-implemented method of claim 4, further comprising establishing, prior to receiving the request to initiate the transaction, the base derivation key between the server computer and a digital wallet computer.

8. The computer-implemented method of claim 4, wherein the encrypted payment data is generated by the wallet provider computer in response to receiving user credentials for the digital wallet from the payment device.

9. The computer-implemented method of claim 4, wherein the key serial number further comprises a transaction counter, wherein the derived key is determined using the transaction counter.

10. The server computer according to claim 1, wherein the key serial number further includes a one-time password.

11. The server computer according to claim 1, wherein the key serial number identifies a shared secret.

* * * * *